(12) United States Patent
Edwards

(10) Patent No.: US 6,276,555 B1
(45) Date of Patent: Aug. 21, 2001

(54) SALAD STORAGE AND DRAINAGE DEVICE

(76) Inventor: Pearl E. Edwards, 5253 Roosevelt Blvd., Philadelphia, PA (US) 19124

( * ) Notice: Subject to any disclaimer, the term of this patent is extended or adjusted under 35 U.S.C. 154(b) by 0 days.

(21) Appl. No.: 09/514,047

(22) Filed: Feb. 25, 2000

(51) Int. Cl.⁷ .................................................. B65D 1/34
(52) U.S. Cl. ...................................... 220/572; 220/23.86
(58) Field of Search .................................. 220/571, 572, 220/23.6, 23.83, 23.86

(56) References Cited

U.S. PATENT DOCUMENTS

| | | | | |
|---|---|---|---|---|
| 985,712 | * | 2/1911 | Springer | 220/912 |
| 1,017,455 | * | 2/1912 | Otto | 220/571 |
| 1,103,169 | * | 7/1914 | Beam | 220/572 |
| 2,585,180 | * | 2/1952 | Smith | 220/912 |
| 3,028,039 | * | 4/1962 | Clark | 220/912 |
| 3,605,433 | | 9/1971 | Strathaus | 62/371 |
| 3,710,589 | | 1/1973 | Brown et al. | 62/457 |
| 3,920,144 | * | 11/1975 | Callen | 220/571 |
| 4,351,164 | | 9/1982 | Christiani | 62/315 |
| 4,520,633 | | 6/1985 | Hoydic | 62/457 |
| 5,345,784 | | 9/1994 | Bazemore et al. | 62/371 |
| 5,653,271 | * | 8/1997 | Brittain et al. | 220/572 |

FOREIGN PATENT DOCUMENTS

623839   *   5/1949   (GB) .................................. 220/571

* cited by examiner

Primary Examiner—Joseph M. Moy
(74) Attorney, Agent, or Firm—Henderson & Sturm LLP

(57) ABSTRACT

A storage and drainage device (10) for the removal and collection of water (50) from freshly washed salad ingredients (100). The device (10) includes an upper lid member (30), a lower base member (20) defining a liquid reservoir (23) and an intermediate drainage member (40) that is dimensioned to be received within both the lid member (30) and the base member (20) in an invertible fashion. The drainage member (40) has an apertured floor panel (41) that will support salad ingredients (100) so that water (50) will flow by gravity into the liquid reservoir (23).

8 Claims, 1 Drawing Sheet

U.S. Patent      Aug. 21, 2001      US 6,276,555 B1
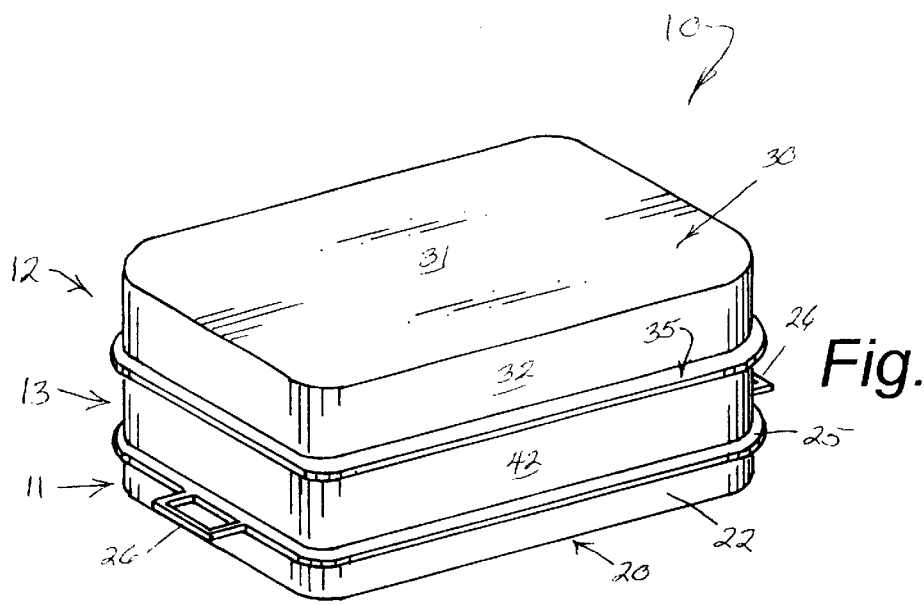
Fig. 1
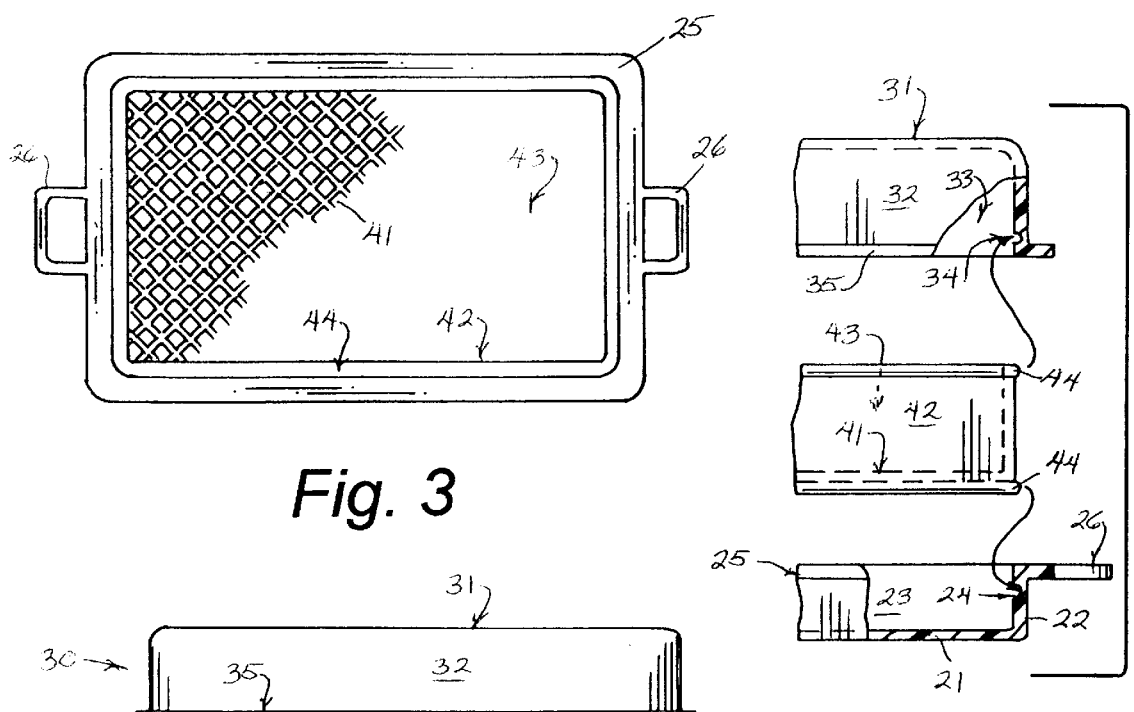
Fig. 3
Fig. 4
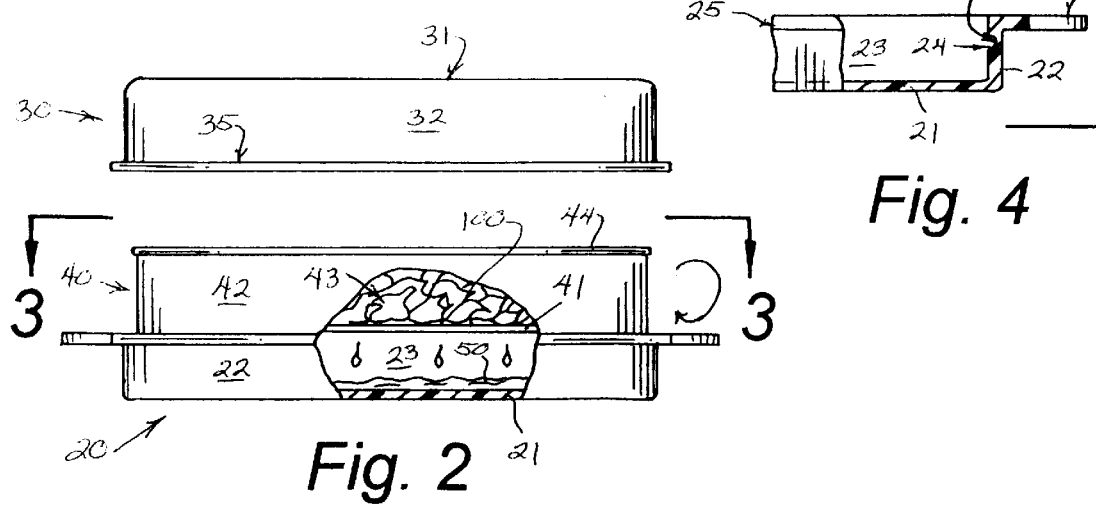
Fig. 2

SALAD STORAGE AND DRAINAGE DEVICE

BACKGROUND OF THE INVENTION

1. Field of the Invention

The present invention relates to the field of specialized containers in general, and in particular to a container that will both store and drain moisturizer from washed salad components.

2. Description of Related Art

As can be seen by reference to the following U.S. Pat. Nos. 3,605,433; 3,710,589; 4,351,164; 4,520,633, and 5,345,784, the prior art is replete with myriad and diverse storage containers having a separate fluid compartment.

While all of the aforementioned prior art constructions are more than adequate for the basic purpose and function for which they have been specifically designed, they are uniformly deficient with respect to their failure to provide a simple, efficient, and practical container that will provide storage, as well as a segregated drainage compartment for freshly washed salad components such as leafy vegetables, celery, tomatoes and the like.

As most people are aware, it is always advisable to wash pesticides and dirt from the surface of salad mixings for obvious health reasons. However, the washing process also deposits a significant amount of moisture on the salad ingredients which will invariably dilute the salad dressing unless the salad ingredients are properly drained or subjected to other drying processes such as spinning, or patting dry with paper towels.

As a consequence of the foregoing situation, there has existed a longstanding need for a new and improved type of storage container for salad ingredients that will allow the freshly washed ingredients to be simultaneously drained and air dried in a chilled environment to keep the ingredients fresh and crisp up until the time that they are mixed in a salad, and the provision of such a construction is a stated objective of the present invention.

BRIEF SUMMARY OF THE INVENTION

Briefly stated, the salad storage and drainage device that forms the basis of the present invention comprises in general a lower base unit, an upper lid unit, and a reversible intermediate drainage unit that is releasably connected to both the upper lid unit and the lower base unit to produce a variety of drainage configurations of the device.

As will be explained in greater detail further on in the specification, the drainage unit includes a drainage member having sidewalls that can sealingly engage the interior surfaces of both the base unit and the lid unit, and an apertured floor panel that will support the freshly washed salad ingredients above the base unit so that water droplets can collect within a liquid reservoir formed within the base unit.

In addition, the lid unit has a much larger volume capacity that the base unit and is further designed to form an extension of the storage chamber created by the lid unit and the drainage member when the apertured floor panel is disposed on the lower end of the drainage member.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the salad ingredient storage and drainage device that forms the basis of this invention;

FIG. 2 is a partially exploded cut away view of the storage and drainage device;

FIG. 3 is a top plan view of the drainage unit engaged in the base unit as viewed through line 3—3 of FIG. 2; and FIG. 4 is an exploded partial cut away view of one end of the storage and drainage device.

DETAILED DESCRIPTION OF THE INVENTION

As can be seen by reference to the drawings, and in particular to FIG. 1, the salad ingredient storage and drainage device that forms the basis of the present invention is designated generally by the reference number 10. The device 10 comprises in general a lower base unit 11, and upper lid unit 12, and an intermediate drainage unit 13. These units will now be described in seriatim fashion.

As shown in FIGS. 2 through 4, the lower base unit 11 comprises a geometrically configured base member 20 having a floor 21 and raised sidewalls 22 which define a liquid reservoir 23. The interior of the sidewalls 22 are provided with a peripheral recess 24 spaced from the top of the sidewalls 22 which is provided with an outwardly extending peripheral lip 25 having a plurality of handle elements 26.

Turning now to FIGS. 1, 2, and 4, it can be seen that the upper lid unit 12 comprises a lid member 30 having a top surface 31 provided with downwardly depending sidewalls 32 which define an interior storage chamber 33 having a peripheral recess 34 which is spaced from the bottom of the lid member 30 which is provided with an outwardly extending peripheral lip 35.

As can best be seen by reference to FIGS. 1 through 4, the intermediate drainage unit 13 comprises a drainage member 40 having an apertured floor panel 41 provided with raised sidewalls 42 which define an open ended storage compartment 43. Both the upper and lower ends of the drainage member 40 are provided with peripheral beads 44 which are adapted to be releasably engaged in an interchangeable fashion in the peripheral recesses 24 and 34 formed in the base member 20 and the lid member 30, respectively for reasons that will be explained presently.

As can also be seen by reference to FIGS. 1, 2, and 4, in the preferred embodiment of the invention, the sidewalls 32 and 42 of the lid member 30 and drainage member 40 are substantially higher than the sidewalls 22 of the base member 20 such that the storage compartments 33 and 43 have a greater capacity than the liquid reservoir 23, due to the fact that the volume of liquid 50 that will be drained from the salad ingredients 100 will occupy substantially less space within the device 10.

As was previously mentioned, the drainage member 40 is designed and intended to be reversibly connected with respect to both the lid member 30 and the base member 20 so that the user may employ centrifugal force to expel droplets of liquid from the salad ingredients prior to placing the device 10 into a refrigerator for the final gravity drainage of the liquid during the storage of the device 10 within a refrigerator.

To accomplish this centrifugal drainage, the washed salad ingredients 100 are placed in the base member 20 and the drainage member 40 is inverted so that the drainage floor panel 41 is at the top of the drainage member 20.

The drainage member 40 is then inserted into the base member 20 to captively engage the wet salad ingredients 100 and then one or more of the handles 26 of the base member 20 may be grasped to shake or spin the base member 20 is dislodge water droplets from the salad ingredients.

At this point, the drainage member is positioned beneath the base member 20 which would be removed from the drainage member 40 and replaced by the lid member 30. The base member would be re-engaged with the lower portion of the drainage member 40 as depicted in FIGS. 1, 2, and 4 so that any remaining liquid could be removed by gravity drainage and/or evaporation in an instance wherein the lid member 30 would be removed from the drainage member 40.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A storage and drainage device for wet salad ingredients wherein the device comprises:

a lower base unit including a base member having a floor and raised sidewalls which define a liquid reservoir; having a first fluid volume capacity an upper lid unit including a lid member having a top surface provided with downwardly depending sidewalls wherein the top surface and downwardly depending sidewalls define an interior storage chamber having a second fluid volume capacity which is greater than said first fluid volume capacity; and an intermediate drainage unit including a drainage member dimensioned to be sealingly engaged by the sidewalls of both the base member and the lid member wherein the drainage member includes an apertured floor panel surrounded by sidewalls and having a third fluid volume that is approximately equal to the second fluid volume of the upper lid unit wherein the sealing engagement between the drainage member and the lower base unit and the upper lid unit is reversible to raise and lower the apertured floor panel relative to the upper lid unit and the lower base unit respectively.

2. The device as in claim 1 wherein the drainage member has an upper end and a lower end wherein the apertured floor panel extends across one of said upper and lower ends.

3. The device as in claim 1 wherein the volume of the liquid reservoir is substantially smaller than the volume of said storage chamber.

4. The device as in claim 2 wherein the base member is provided with an upper end having an outwardly projecting peripheral lip.

5. The device as in claim 4 wherein said outwardly projecting peripheral lip is provided with at least one handle element.

6. The device as in claim 4 wherein said outwardly projecting peripheral lip is provided with a pair of handle elements.

7. The device as in claim 2 wherein the sidewalls of both the lid member and the base member are provided with internal peripheral recesses.

8. The device as in claim 7 wherein the upper end and the lower end of the drainage member are provided with external peripheral beads which are dimensioned to be received in the internal peripheral recesses of both the lid member and the base member.

* * * * *